US 8,523,980 B2

(12) United States Patent
Fernandez-Han

(10) Patent No.: US 8,523,980 B2
(45) Date of Patent: Sep. 3, 2013

(54) CLEAN WATER RECLAMATION FROM HUMID AIR

(76) Inventor: Javier Fernandez-Han, Conroe, TX (US)

( * ) Notice: Subject to any disclaimer, the term of this patent is extended or adjusted under 35 U.S.C. 154(b) by 280 days.

(21) Appl. No.: 12/986,368

(22) Filed: Jan. 7, 2011

(65) Prior Publication Data

US 2012/0174603 A1   Jul. 12, 2012

(51) Int. Cl.
*F25J 3/00*    (2006.01)

(52) U.S. Cl.
USPC ............. 95/288; 126/620; 126/635; 126/651; 203/12; 62/93; 62/640

(58) Field of Classification Search
USPC ............... 95/288, 289; 55/418; 62/606, 617; 165/DIG. 184
See application file for complete search history.

(56) References Cited

U.S. PATENT DOCUMENTS 4,685,534 A * 8/1987 Burstein et al. ............... 181/251

OTHER PUBLICATIONS

C. Johnson. Public—MB-Soft.com. Pure Distilled Water for Third World Village Residents. Oct. 3, 2008. Date Accessed: Dec. 5, 2012—13:37.*
Gustafsson. Gustafsson, A-M., Lindblom, J. Apr. 2001. Luleå Instiute of Technology. Underground Condensation of Humid Air—a Solar Driven System for Irrigation and Drinking-Water Production.*
Sharan et al.,"Performance of single pass earth-tube heat exchanger: An experimental study", Gujarat Energy Development Agency (GEDA), Vadodara / Ministry of Agriculture, New Delhi, Jul. 2003.

* cited by examiner

*Primary Examiner* — Duane Smith
*Assistant Examiner* — Joubert X Glover
(74) *Attorney, Agent, or Firm* — Arent Fox LLP

(57) ABSTRACT

An apparatus for water reclamation includes an inlet head for admitting warm humid ambient air, a buried pipe coupled at a first end to the inlet head and sloping downward in the ground from the first end. Water condenses as the air is cooled in the buried pipe and collects in a cistern coupled at a second end of the buried pipe. A tube coupled at a lower end near the second end of the buried pipe includes a heated element extending at least partially into the tube from an upper end of the tube. Cooled air is heated by the heated element and is expelled at the top of the tube. A heater is coupled to an upper end of the heated element. The heater may be a solar collector with a Bernoulli aperture.

25 Claims, 3 Drawing Sheets

CLEAN WATER RECLAMATION FROM HUMID AIR

BACKGROUND

I. Field

The following description relates generally to water reclamation and more particularly to a method and apparatus for reclamation of clean water from humid air.

II. Background

More than one sixth of the world's population—approximately 1 billion people—does not have access to safe drinking water. One fourth of child deaths worldwide under the age of 5 are due to a water related disease. Nearly 80% of illnesses in developing countries are linked to poor water and sanitation conditions.

In some locations drilling a well to tap ground water, sealing it to prevent contamination, and pumping the water to the surface, and testing it for safety is a possible solution. An investment in hole drilling—from 50 to more than 200 feet, casing installation and capping, may not be appropriate or cost effective because the ground water may not exist at these depths, or the population served may be too small to justify the cost.

Whereas drilling may be the only possible option in arid climates, many regions in jungle and rainforest climates also have unique needs for clean water that are not amenable to drilling for well water. In many instances, powered pumping to lift water from a deep well is not practical for lack of access to fuel or electricity to operate pumps.

Consequently, it would be desirable to address one or more of the deficiencies described above.

SUMMARY

The following presents a simplified summary of one or more aspects of a method and apparatus for producing affordable clean water in warm humid climates.

According to various aspects, the subject innovation relates to apparatus and methods that provide affordable clean water in warm humid climates, wherein the method and apparatus requires no external machine power to raise the water to ground level for consumption, so that manual power is sufficient.

In one aspect of the disclosure, an apparatus for water reclamation includes an inlet head for admitting warm humid ambient air, a buried pipe coupled at a first end to the inlet head and sloping downward in the ground from the first end, a cistern coupled at a second end of the buried pipe, a heat element in a tube coupled at a lower end of the tube near the second end of the buried pipe, and a heater coupled to an upper end of the heated element. The heater may be a passive solar heater. The tube may further include one or more Bernoulli apertures to expel air heated by the heater element as it rises in the tube.

In an aspect of the disclosure, a method for water reclamation includes admitting warm humid ambient air into an inlet head. The warm humid air flows through a buried pipe sloping downward from a first end to a second end, wherein the second end is deeper than the first end. The warm humid air is cooled in the downward sloping pipe. Water condenses from the flowing warm humid air as it condenses. The condensing water collects in a cistern coupled to the second end of the downward sloping pipe. The cooled air is caused to rise through a tube coupled at the second end of the buried pipe by a heat pipe coupled to a heater for warming the cooled air. The warmed air is expelled at an upper portion of the tube. The heater may function as a passive solar heater.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents

BRIEF DESCRIPTION OF THE DRAWINGS

These and other sample aspects of the invention will be described in the detailed description that follow, and in the accompanying drawings, wherein.

Figure 1:
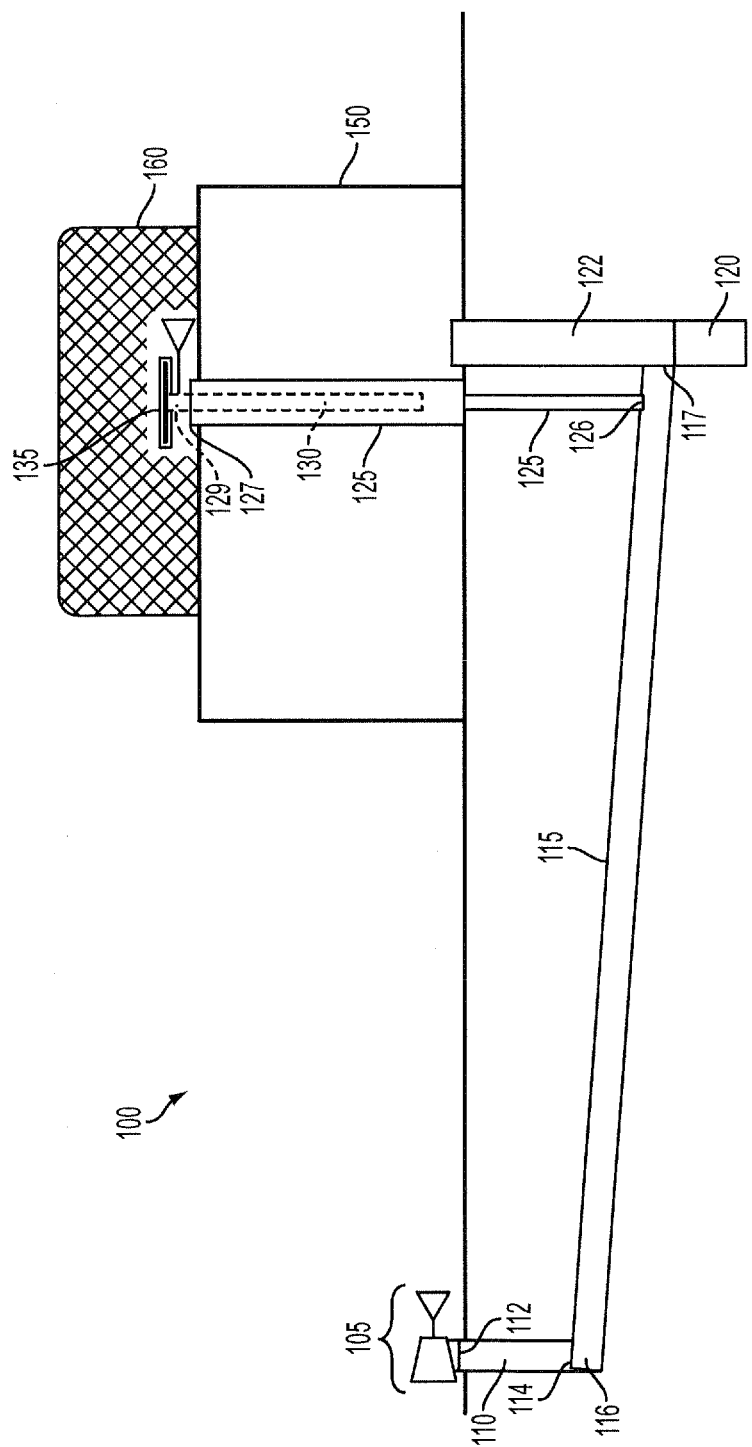
FIG. 1 is a conceptual illustration of a water reclamation system in accordance with an aspect of the disclosure.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of methods and apparatus are described more fully hereinafter with reference to the accompanying drawings. These methods and apparatus may, however, be embodied in many different forms and should not be construed as limited to any specific structure or function presented throughout this disclosure. Rather, these aspects are provided so that this disclosure will be thorough and complete, and will fully convey the scope of these methods and apparatus to those skilled in the art. Based on the descriptions herein teachings herein one skilled in the art should appreciate that that the scope of the disclosure is intended to cover any aspect of the methods and apparatus disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure herein may be embodied by one or more elements of a claim.

In a climate of a tropical jungle or rainforest environment, humidity may be quite high, with significant rainfall. However, runoff water collection from rainfall in tropical climates may not guarantee a pure source of water, because of the contact with contaminants the rainwater may have with exposed surface collection systems.

Several aspects of a clean water reclamation apparatus will now be presented with reference to FIG. 1. A water collection system 100 is shown with an inlet head 105 for admitting warm humid air into a first vertical pipe 110 at a first end 112 above ground. A second end 114 of the first vertical pipe terminates several feet below ground. Generally, the temperature of soil several feet below ground is cooler than the surface temperature. The second end 114 of the first vertical pipe 110 is coupled to a ground embedded downward sloping pipe 115 at a first end 116 of the downward sloping pipe 115. As the ground cools the humid air in the downward sloping pipe 115, moisture condenses on the inner walls and trickles along the downward sloping pipe 115 to a second end 117 which terminates in a cistern 120.

The cistern 120 is at the bottom of a bore hole 122, through which water can be recovered from the cistern 120 to ground level for consumption. Since the depth of the cistern 120 below ground does not depend on the depth of any ground water, the cistern 120 need not be placed at a depth requiring machine driven pumping to obtain the water, although machinery may be employed. In a preferred embodiment, the cistern 120, and downward sloping pipe 115 may be located at depths that can be conveniently excavated by manual labor, if excavation machinery is not available. Thus, the capital investment in preparing the water collection system 100 may be reduced relative to that of machine excavation.

Near to the second end 117, a second vertical pipe 125 has a first end 126 coupled to the downward sloping pipe 115. The second vertical pipe 125 terminates with a second end 127 above ground. A heat pipe 130 may be located in at least an upper portion of the second vertical pipe 125, and may be terminated by a solar collector 135 at an upper end 129 of the heat pipe 130 to elevate the temperature of the heat pipe 130. The temperature elevated heat pipe 130 will heat the air in the column formed by the second vertical pipe 125, urging it to rise, where it may escape through one or more Bernoulli apertures, described below.

Figure 2:
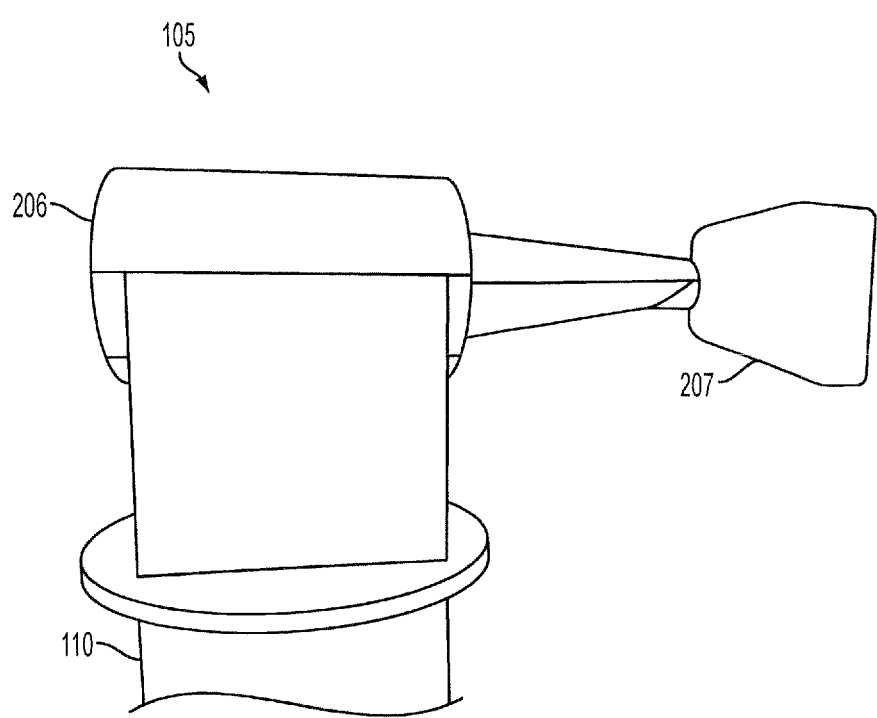
FIG. 2 is a conceptual illustration of an inlet for warm humid air of the system of FIG. 1.

FIG. 2 illustrates details of the inlet head 105. The inlet head 105 includes a rotatable intake port 206 to admit ambient warm, humid air. A weather vane 207 responds to wind direction to direct the intake port 206 to face into the wind, thus urging the air to enter the intake port 206 and thence down the first vertical pipe. A screen (not shown) or other type of filtration, may be deployed at the entrance of the intake port 206, or the throat of the first vertical pipe 110 to reduce or eliminate introduction of insects, particulates, or small animals, thus ensuring the quality of the water by minimizing the opportunity for contamination.

Figure 3:
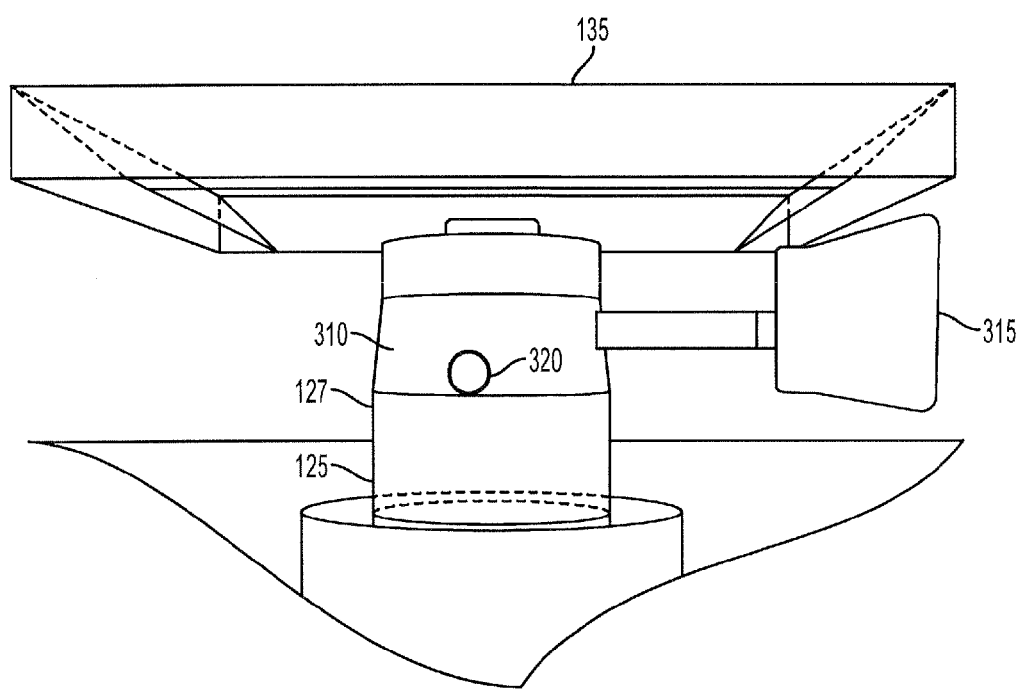
FIG. 3 is a conceptual illustration of a vent for expelling air warmed by the system of FIG. 1.

FIG. 3 illustrates details relating to features located at the second end 127 of the second vertical pipe 125. A rotatable section 310 of the second end 127 of the second vertical pipe 125 top includes a weather vane 315 to direct the rotatable section 310 in a preferred direction. The rotatable section 310 has one or more holes 320 preferentially located transverse to the axis of the weather vane 315. Wind incident on the rotatable section 310 will then pass around the sides of the rotatable section 310 and pass over the holes 320. By action of the Bernoulli Principal, the air flow over the holes 320 due to the transverse motion of the wind causes a reduction in air pressure, on the surface of rotatable section 310 relative to the air inside the second vertical pipe 125, thus drawing heated air in the second vertical pipe 125 outward through the holes. For this reason, the holes 320 are also referred to as Bernoulli apertures 320. The effect of the pressure drop from inside the holes to the outside is to draw the air heated and rising in the second vertical pipe 125 to exit, thus promoting an air flow into the intake port 206, through the water collection system and out through the Bernoulli apertures 320, replenishing the supply of humid air, from which water is cooled and condenses as the air travels through the downward sloping pipe 115.

In an embodiment, the well bore 122 may be enclosed in a secure structure 150, as shown in FIG. 1, to prevent access that may result in contamination of the water in the cistern 120, or unapproved access to obtain water. The solar collector 135 and rotatable section 310 may extend above a roof of the structure 150 to provide a measure of inaccessibility, thus reducing potential for contamination or unauthorized access to the reclaimed water. A screen or equivalent protective enclosure 160 may be placed on the roof of the structure surrounding the solar collector 135 and rotatable section 210 to prevent or reduce introduction of insects, particulates, animals or other contamination through the second vertical pipe 125.

In an embodiment, a method for reclaiming water from humid air includes admitting warm humid air from ambient air into the inlet head 105. The warm humid air experiences cooling in the downward sloping buried pipe 115 which is coupled to the inlet head 105. Cooling the air causes moisture to condense. The condensed air is collected by flowing downward in the buried pipe 115 into the cistern 120 coupled to the buried pipe 115. Heating the cooled air in the vertical tube 125 causes the heating air to rise, where it is expelled through the Bernoulli aperture 320.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for water reclamation comprising:
   an above ground inlet for admitting warm humid ambient air;
   a buried pipe coupled to the inlet head and sloping downward in the ground;
   a cistern coupled to a downward end of the buried pipe;
   a heat element in an exit tube coupled at a downward end of the buried pipe;
   a passive heater coupled to the heated element; and
   a one or more Bernoulli apertures arranged on an upper end portion of the tube that is rotatable to position the apertures to face normal to the natural flow of ambient air.

2. The apparatus of claim 1, wherein the inlet comprises:
   a rotatable intake port; and
   a weather vane to respond to wind direction for aiming the rotatable intake port to face into the wind.

3. The apparatus of claim 1 further comprising a first vertical pipe coupled at a first end to the inlet head and coupled at a second end to the first end of the buried pipe.

4. The apparatus of claim 1 further comprising a weather vane coupled to the rotatable portion of the tube arranged to direct wind to pass around the rotatable upper portion transversely to the one or more Bernoulli apertures.

5. The apparatus of claim 1, wherein the heater is a solar collector.

6. The apparatus of claim 1 further comprising a borehole coupled to the cistern.

7. The apparatus of claim 2, wherein the intake port comprises a filter to reduce or eliminate introduction of insects, particulates, small animals, and/or other contamination through the intake port.

8. The apparatus of claim 1, wherein the tube port comprises a filter to reduce or eliminate introduction of insects, particulates, small animals, and/or other contamination through the tube.

9. The apparatus of claim 1, wherein the tube port comprises a filter to reduce or eliminate introduction of insects, particulates, small animals, and/or other contamination through the one or more Bernoulli apertures.

10. A method for water reclamation comprising:
admitting warm humid ambient air into an inlet head;
flowing the warm humid air through a buried pipe sloping downward from a first end to a second end, wherein the second end is deeper than the first end;
cooling the flowing warm humid air in the downward sloping pipe;
condensing water from the flowing warm humid air as it cools;
collecting the condensing water in a cistern coupled to the second end of the downward sloping pipe;
causing the cooled air to rise through an exit tube coupled at the second end of the buried pipe, wherein the tube includes a heat pipe coupled to a heater for warming the cooled air and a one or more Bernoulli apertures arranged on an upper end portion of the tube that is rotatable to position the apertures to face normal to the natural flow of ambient air; and
expelling the warmed air at an upper portion of the tube through the Bernoulli apertures.

11. The method of claim 10 further comprising:
attaching a weather vane to the rotatable intake port to respond to wind direction for aiming the rotatable intake port to face into the wind; and
admitting the warm humid air into the inlet head through a rotatable intake port.

12. The method of claim 10 further comprising directing the admitted warm humid air down a first vertical pipe coupled at a first end to the inlet head and coupled at a second end to the first end of the buried pipe.

13. The method of claim 10 further comprising directing wind to pass around the rotatable upper portion transversely to the one or more Bernoulli apertures with a weather vane coupled to the rotatable portion of the tube.

14. The method of claim 10, wherein the heater is a solar collector.

15. The method of claim 10 further comprising recovering the water condensed from the humid air through a borehole coupled to the cistern.

16. The method of claim 11 further comprising filtering the warm humid air to reduce or eliminate introduction of insects, particulates, small animals, and/or other contamination through the intake port.

17. The method of claim 10 further comprising filtering the air to reduce or eliminate introduction of insects, particulates, small animals, and/or other contamination through an upper end of the tube.

18. The method of claim 10 further comprising filtering the air to reduce or eliminate introduction of insects, particulates, small animals, and/or other contamination through the one or more Bernoulli apertures.

19. A water reclamation system comprising:
means for admitting ambient air into a buried downward sloping path;
means for collecting and storing water precipitating from the air in the buried downward sloping path; and
means for passively removing the air at the downward sloping path using one or more Bernoulli apertures arranged on an upper end portion of passive air removal a means that is rotatable to position the Bernoulli apertures to face normal to the natural flow of the ambient air and coupled to the means for passively removing the air.

20. The water reclamation means of claim 19 further comprising means for recovering the stored water.

21. The water reclamation means of claim 19 further comprising means for filtering the air to reduce or eliminate introduction of insects, particulates, small animals, and/or other contamination through the admitting means, the air removing means and/or the collecting means.

22. A passive apparatus for dehumidification comprising:
an inlet for admitting ambient air from above ground;
a subterranean path coupled to the inlet for cooling the air;
an exit coupled to the subterranean path for releasing the cooled air above ground;
a passive heater coupled to the exit for warming and urging the released air to rise to the exit, wherein the exit comprises one or more Bernoulli apertures arranged on the exit, and further comprises a rotatable portion to position the apertures to face normal to the natural flow of ambient air; and
a cistern coupled to the subterranean path for collecting water precipitated from the cooled air.

23. A passive apparatus for water reclamation comprising:
an inlet for admitting air from above ground;
a subterranean path coupled to the inlet for cooling the air;
an exit coupled to the subterranean path for releasing the cooled air above ground;
a passive heater coupled to the exit for warming and urging the released air to rise to the exit, wherein the exit comprises one or more Bernoulli apertures arranged on a portion of the exit that is rotatable to position the apertures to face normal to the natural flow of ambient air; and
A cistern coupled to the subterranean path for collecting water precipitated from the cooled air.

24. The passive apparatus of claim 23 further comprising:
A filter coupled to the inlet to reduce or eliminate introduction of insects, particulates, small animals, and/or other contamination through the admitting means, the air removing means and/or the collecting means.

25. The passive apparatus of claim 23 further comprising:
A filter coupled to the exit to reduce or eliminate introduction of insects, particulates, small animals, and/or other contamination through the admitting means, the air removing means and/or the collecting means.

* * * * *